United States Patent [19]
Domit, Jr.

[11] Patent Number: 6,102,196
[45] Date of Patent: Aug. 15, 2000

[54] WIRE LINK CONNECTION SYSTEM AND METHOD

[75] Inventor: Edward J. Domit, Jr., Westford, Mass.

[73] Assignee: Wire Belt Company of America, Londonderry, N.H.

[21] Appl. No.: 09/008,714

[22] Filed: Jan. 19, 1998

[51] Int. Cl.[7] .................................................. B65G 15/54
[52] U.S. Cl. .......................... 198/848; 198/850; 198/853
[58] Field of Search ................................... 198/848, 850, 198/853

[56] References Cited

U.S. PATENT DOCUMENTS

| | | | |
|---|---|---|---|
| 188,116 | 3/1877 | Ewart . | |
| D. 319,328 | 8/1991 | Faulkner | D34/29 |
| 327,108 | 9/1885 | Proctor, et al. . | |
| 449,464 | 3/1891 | Cook . | |
| 507,865 | 10/1893 | White . | |
| 690,934 | 1/1902 | Dick . | |
| 1,012,124 | 12/1911 | Conkling . | |
| 1,377,450 | 5/1921 | Whipple . | |
| 1,895,345 | 1/1933 | Pink . | |
| 1,956,298 | 4/1934 | Paulson . | |
| 2,065,931 | 12/1936 | Alling . | |
| 2,541,632 | 2/1951 | Baugh . | |
| 2,766,635 | 10/1956 | Schwarzkopf . | |
| 2,826,383 | 3/1958 | Spencer, Jr. . | |
| 3,082,861 | 3/1963 | Kornylak . | |
| 3,794,155 | 2/1974 | Bechtel, Jr. | 198/194 |
| 3,958,686 | 5/1976 | Bradford | 198/189 |
| 4,016,971 | 4/1977 | Komossa et al. | 198/850 |
| 4,262,392 | 4/1981 | White | 24/36 |
| 4,410,083 | 10/1983 | Poerink | 198/853 |
| 4,473,365 | 9/1984 | Lapeyre | 474/212 |
| 4,744,211 | 5/1988 | Abe | 59/85 |
| 4,754,871 | 7/1988 | Gustafson | 198/848 |
| 4,846,339 | 7/1989 | Roinestad | 198/852 |
| 4,937,921 | 7/1990 | Musil | 24/33 |
| 4,944,716 | 7/1990 | Graff | 474/255 |
| 4,981,210 | 1/1991 | Kornylak | 198/845 |
| 4,996,750 | 3/1991 | Musil | 24/33 |
| 5,123,523 | 6/1992 | Langlois et al. | 198/844.1 |
| 5,176,249 | 1/1993 | Esterson et al. | 198/850 |
| 5,190,143 | 3/1993 | Froderberg et al. | 198/778 |
| 5,217,577 | 6/1993 | Steiner | 162/232 |
| 5,316,133 | 5/1994 | Moser | 198/850 |
| 5,404,998 | 4/1995 | Frye | 198/848 |
| 5,908,106 | 6/1999 | Krueger | 198/848 |

*Primary Examiner*—Christopher P. Ellis
*Assistant Examiner*—Gene O. Crawford
*Attorney, Agent, or Firm*—Bourque & Associates, P.A.

[57] ABSTRACT

A wire link connection system includes at least first and second wire connection links that connect a first wire link to a second wire link, for example, as a splice connection in a wire conveyor belt. The wire connecting links include linking portions that link the first and second wire links. One of the wire connecting links includes a female coupling portion such as a coupling loop at or proximate one end, while the other wire connecting link includes a male coupling portion, such as a coupling hook, at or proximate one end. The male coupling portion engages the female coupling portion in a "snap" fit to couple the first and second wire connecting links. The female coupling portion or coupling loop defines an aperture and the male coupling portion or coupling hook includes a flared head such that the male coupling portion is received in the aperture and the flared head engages and locks with the coupling loop.

21 Claims, 6 Drawing Sheets

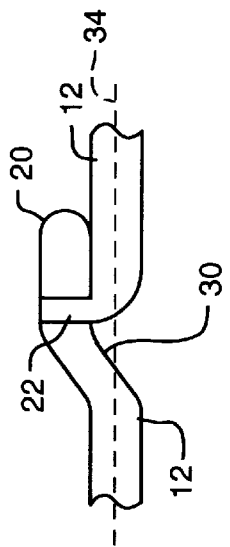
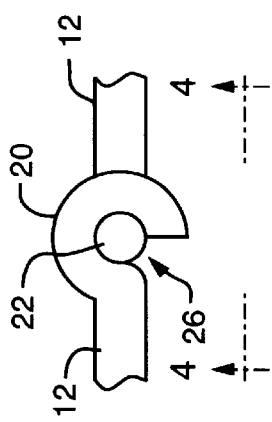
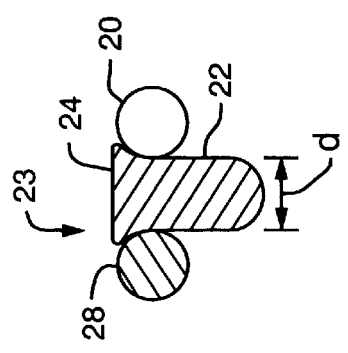
FIG. 4
FIG. 3
FIG. 2

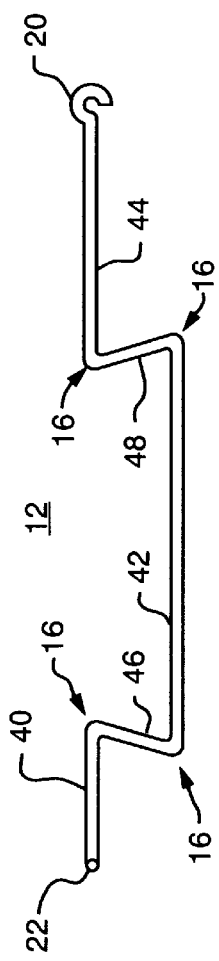
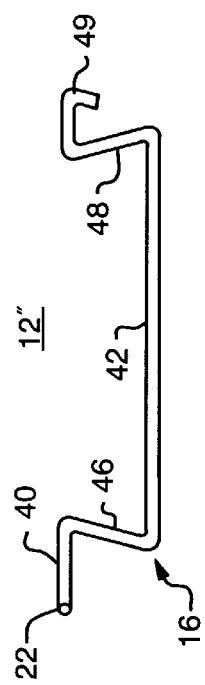

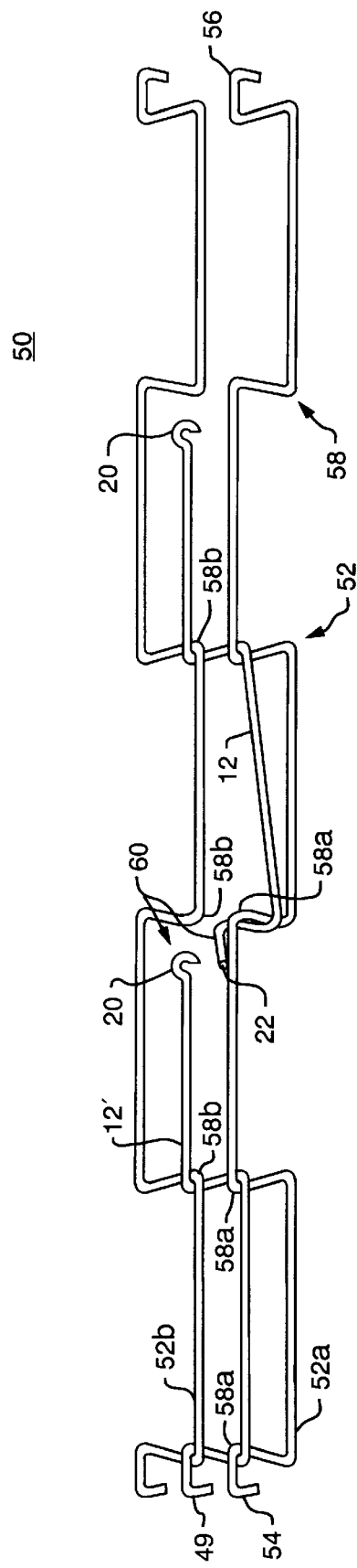

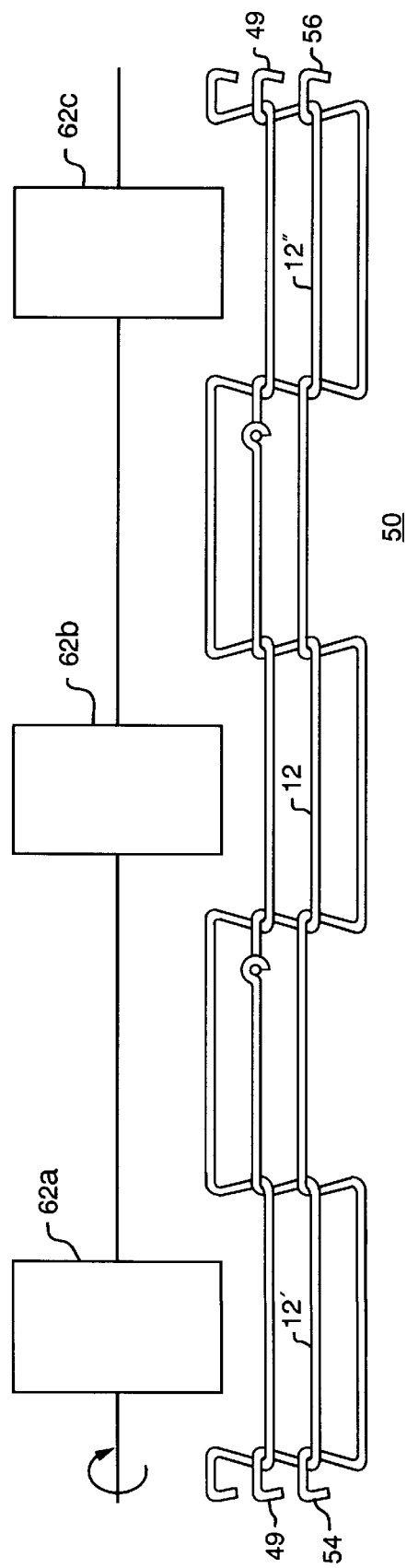

WIRE LINK CONNECTION SYSTEM AND METHOD

FIELD OF THE INVENTION

The present invention relates to a system and method for connecting wire links, and more particularly, to a wire link connection system and method for providing a splice connection in a wire conveyor belt.

BACKGROUND OF THE INVENTION

Wire conveyor belts are commonly used for conveying articles during cooling, drying, coating, cooking, and many other applications. In one particular application, wire belts are used to convey food, articles during cooking or processing of the food. Wire belts are advantageous for food processing because they provide an open flow through mesh, a high degree of flexibility, a sanitary construction, simple installation and maintenance, and the ability to be positively driven. A conventional wire belt typically includes a plurality of wire strands or links interlocked or joined together to form an endless conveyor belt. One way of interlocking the wire links is by weaving the individual wire links with an adjacent wire link in the wire belt. To form an endless wire conveyor belt, a splice connection must be made between at least two of the wire links in the wire belt.

The splice connections used in wire belts have often presented a number of problems with respect to the strength of the wire belt and the installation of the splice connection. In one example, splice clips are used to provide a connection between wire links being spliced together in the wire belt. Using splice clips often leaves a gap between the wire links, allowing the products being conveyed to fall through the wire belt. In another example, a splice connection is made using a full wire strand that is woven between the wire links being spliced together. The full strand is difficult to install because the strand must be bent as it is woven. Moreover, bending the strand often distorts and weakens the strand, resulting in a wire belt that is susceptible to failure or breakage.

Accordingly, a need exists for a wire connection system that can more easily be interlocked and connected without excessively distorting and damaging the wire strands. In particular, a need exists for a wire belt splicing system that does not leave a gap in the wire belt and that does not require excessive bending of the splicing links when the splice connection is made and which can be easily cleaned to meet food conveying standards.

SUMMARY OF THE INVENTION

The present invention features a wire link connection system for connecting a first wire link to a second wire link. The wire link connection system includes at least first and second wire connecting links each having first and second ends, and at least one linking portion, for linking with the first and second wire links. The first wire connecting link includes a female coupling portion at one of the first and second ends of the first wire connecting link, and the second wire connecting link includes a male coupling portion at one of the first and seconds ends of the second wire connecting link. The male coupling portion is adapted to engage the female coupling portion in a snap fit fashion, for coupling the first and second wire connecting links.

According to the preferred embodiment of the wire connecting links, the female coupling portion is a loop defining an aperture, and the male coupling portion is a hook adapted to be received by the aperture and to lock with the loop. The hook preferably has a flared head, for example, with a diameter that is larger than a diameter of the aperture formed by the loop. The loop preferably extends generally in circular path in at least 270°.

The present invention also features a wire connecting link including: a plurality of lateral segments and a bend segment extending between each of the plurality of lateral segments forming linking portions, for linking with first and second wire links. A coupling loop is disposed at an end of one of the lateral segments and defines an aperture for receiving a coupling hook of another wire connecting link. A coupling hook is disposed at an end of another of the lateral segments, for engaging a coupling loop of another wire connecting link.

According to one embodiment of the wire connecting link, the plurality of segments further include first, second and third lateral segments. A first bend segment extends between the first lateral segment and the second lateral segment, and a second bend segment extends between the second lateral segment and the third lateral segment. The coupling hook is disposed on the first lateral segment, and the coupling loop is disposed on the third lateral segment. The first lateral segment is preferably shorter than the third lateral segment. According to another embodiment, the wire connecting link includes a belt connecting end at one end and a coupling hook or coupling loop at the other end.

The present invention also features a wire belt including: a plurality of wire links, each of the plurality of wire links being linked with at least one adjacent wire link in the wire belt. Each of the wire links includes a first end, a second end, and a plurality of linking portions extending between the first end and the second end. A splice connection is provided between the first and second wire links of the plurality of wire links. The splice connection includes at least first and second wire connecting links linked with respective linking portions of first and second wire links of the plurality of wire links.

The present invention also features a method of connecting a first link to a second link in a wire belt having a plurality of wire links, each of the wire links having first and second ends and a plurality of linking portions between the first and second ends. The method includes the steps of interlocking a first wire connecting link with at least a first linking portion of each of the first wire link and second wire link and interlocking a second wire connecting link with at least a second linking portion of each of the first wire link and second wire link. The method further includes coupling a female coupling portion at one end of the first wire connecting link to male a coupling portion at one end of the second wire connecting link. In the exemplary method, the first wire link and second wire link are connected to splice the wire belt.

BRIEF DESCRIPTION OF THE DRAWINGS

These and other features and advantages of the present invention will be better understood by reading the following detailed description, taken together with the drawings wherein:

FIG. 2 is an enlarged cross-sectional view taken along line 2—2 in FIG. 1 of the male coupling portion engaged with the female coupling portion of the respective wire connecting links, according to the present invention;

FIG. 3 is an enlarged plan view of the male coupling portion engaged with the female coupling portion, according to the present invention;

FIG. 4 is a side view taken along line 4—4 in FIG. 3 of the first wire connecting link coupled with the second wire connecting link, according to the present invention;

FIGS. 5A–5C are plan views of wire connecting links, according to different embodiments of the present invention;

FIG. 6 is a plan view of a wire belt having wire links being spliced together with wire connecting links, according to the exemplary embodiment of the present invention;

FIG. 7 is a plan view of a wire belt spliced together with the wire connecting links, according to the preferred embodiment of the present invention.

DETAILED DESCRIPTION OF THE PREFERRED EMBODIMENT

Figure 1:
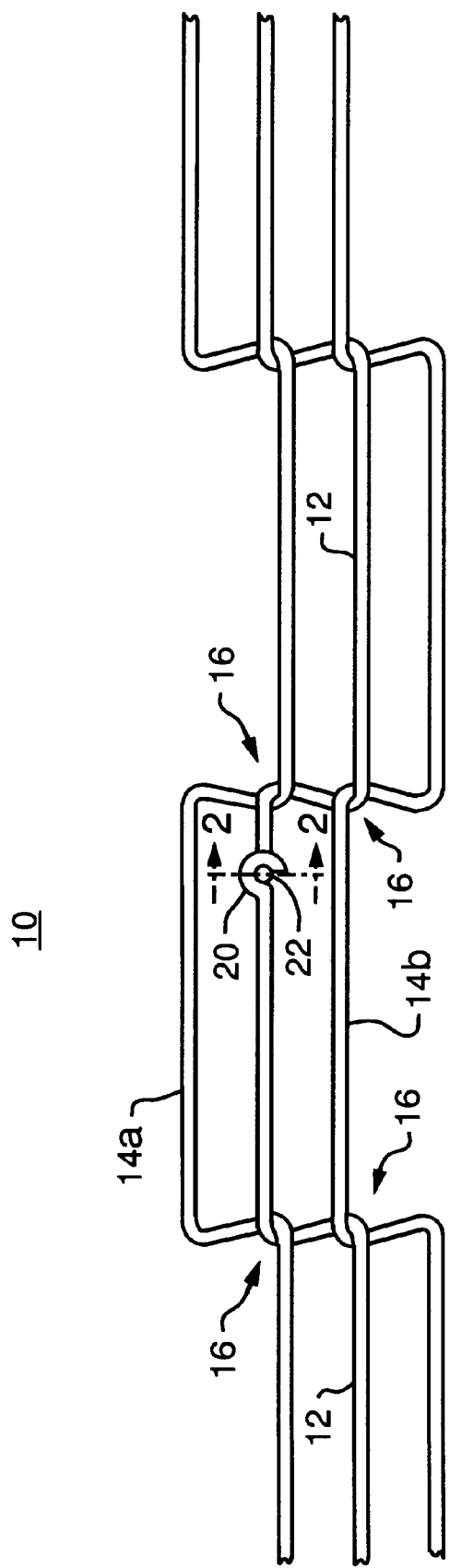
FIG. 1 is a plan view of first and second wire connecting links coupled together, utilizing the wire link connection system according to the present invention.

A wire link connection system 10, FIG. 1, according to the present invention includes at least first and second wire connecting links 12 that are coupled together in a "snap" fit or similar positive locking manner to connect a first wire link 14a to a second wire link 14b. In the exemplary embodiment, the wire link connection system 10 is used to provide a splice connection in a wire conveyor belt, as described in greater detail below. The present invention, however, contemplates using the wire link connection system 10 to connect any type of wire links in any type of application.

The first and second wire connecting links 12 include linking portions 16 that link or otherwise interconnect with the first and second wire links 14a, 14b. One of the wire connecting links 12 includes a female coupling portion 20, such as a coupling loop, at one end of the wire connecting link 12. The other of the wire connecting links 12 includes a male coupling portion 22, such as a coupling hook, at one end of the wire connecting link 12. The male coupling portion 22 engages with the female coupling portion 20 in a "snap" fit or other similar releasably coupled positive locking interconnection, to couple the first and second wire connecting links 12.

The female coupling portion or loop 20, FIG. 2, defines an aperture 23 that receives the male coupling portion or hook 22. The male coupling portion 22 preferably has a flared head 24 (i.e., cold headed) that is larger than the diameter "d" of the aperture formed by the female coupling portion 20 and locks with the female coupling portion 20. The diameter "d" of the aperture 23 is preferably about equal to a wire diameter of the wire connecting links 12 such that the male coupling portion 22 fits within the aperture 23 while the flared head 24 is locked and prevented from passing through the aperture. The height of the hook 22 is preferably about one wire diameter such that the flared head 24 does not extend generally beyond the top 28 of the female coupling portion 20. In one example, the wire diameter is approximately 0.072 inches and the diameter of the flared head 24 is approximately 0.074 inches.

In the exemplary embodiment, the female coupling portion or loop 20, FIG. 3, extends generally in a circular path leaving an opening 26 sufficiently large for the male coupling portion 22 to snap through the opening 26 and into engagement with the female coupling portion 20. In this example, the female coupling portion 20 preferably extends at least about 270° to allow the male coupling portion 22 to snap fit into the aperture of the female coupling portion 20 while preventing the male coupling portion 22 from uncoupling. Although the flared head 24 is shown as having a round shape, the present invention contemplates a flared head having a triangular, square or any other shape as well as a corresponding shape in the female coupling portion 20.

The female coupling portion 20, FIG. 4, preferably extends above the plane 34 of the wire connecting links 12 to engage the male coupling portion 22. A bend or jog 30 in the wire connecting link 12 proximate the female coupling portion 20 allows the coupling portions 20, 22 to engage in this manner.

One embodiment of the wire connecting link 12, FIG. 5A, includes a plurality of lateral segments 40, 42, 44 that are preferably offset and generally lie in parallel planes. The lateral segments 40, 42, 44 of wire connecting link 12 include first, second and third lateral segments 40, 42, 44 with two bend segments 46, 48 extending between the third lateral segment 42 and respective first and third lateral segments 40, 44, forming linking portions 16. The male coupling portion or hook 22 is disposed proximate the end of the first lateral segment 40 while the female coupling portion loop 20 is disposed proximate the end of the third lateral segment 44. Although the male coupling portion 22 is preferably disposed on a shorter lateral segment 40, the present invention contemplates having the female coupling portion 20 on a shorter lateral segment or lateral segments of equal lengths. This wire connecting link 12 is typically used in the center region of a wire belt, as described in greater detail below.

Another embodiment of the wire connecting link 12', FIG. 5B, includes a female coupling portion 20 at one end and a belt connecting end 49 at the other end. The wire connecting link 12' includes first and second lateral segments 42, 44 with bend segments 46, 48 forming linking portions 16.

A further embodiment of the wire connecting link 12", FIG. 5C, includes a male coupling portion 22 at one end and a belt connecting end 49 at the other end. The wire connecting link 12" includes first and second lateral segments 42, 40 with bend segments 46, 48 forming linking portions 16.

The wire connecting links 12', 12" with belt connecting ends 49 are preferably used at side or edge regions of a wire belt, as described in greater detail below. The present invention also contemplates wire connecting links having other types of coupling portions or connecting ends together with the female coupling portion or male coupling portion of the present invention.

Figure 8:
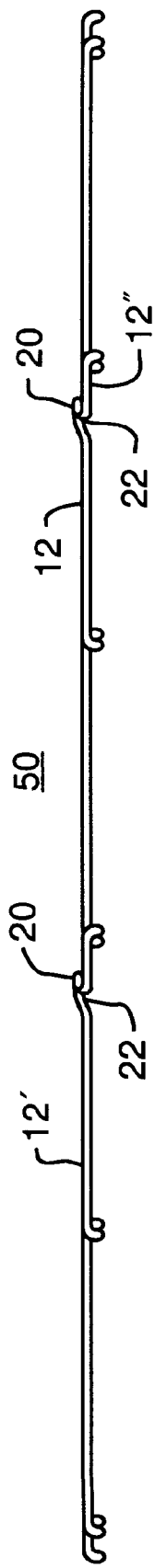
FIG. 8 is a side view of a wire belt spliced together with the wire connecting links, according to the preferred embodiment of the present invention.

One use for the wire connecting links 12, 12', 12", FIGS. 6–8, is in a wire belt 50 having a plurality of wire links 52. Each of the wire links 52 includes a first connecting end 54 and a second connecting end 56, and plurality of linking portions 58 extending between the first and second connecting ends 54, 56, for linking with at least one adjacent wire link 52. The wire connecting links 12, 12', 12" form a splice connection between first and second wire links 52a, 52b in the wire belt 50.

The method of connecting the first wire link 52a, FIG. 6, to the second wire link 52b includes interlocking a first wire connecting link 12' with the linking portions 58a, 58b of the respective first and second wire links 52a, 52b. A second wire connecting link 12 is then interconnected with another group of linking portions 58a, 58b of the respective first and second wire links 52a, 52b. The wire connecting link 12 is preferably woven between the linking portions 58a, 58b of the respective wire links 52a, 52b as shown generally by arrow 60. When the wire connecting links 12, 12' are interlocked with the wire links 52a, 52b, the female coupling portion 20 and male coupling portion 22 of the respective first and second wire connecting links 12, 12' are coupled or "snapped" together as described above. Any number of wire connecting links 12 can be connected with the wire links 52a, 52b and coupled together in this manner depending upon the width of the wire belt 50.

The relatively short length of the wire connecting links 12, 12', 12" allows them to be more easily woven between the wire links 52a, 52b without causing excessive bending and damage to the wire. The length of each wire connecting link 12 depends upon the wire diameter and belt pitch. The wire connecting links 12 are preferably sized to prevent plastic deformation in the wire connecting links 12 when they are woven. The resulting splice connection also does not leave any larger gaps that would allow items, such as food products, to fall through the wire belt 50 while being conveyed.

The wire connecting links 12,12', 12", FIG. 7, are preferably coupled in the even spaces of the wire belt 50. The wire belt 50 is driven with belt drivers 62a–62c in the odd spaces of the wire belt 50. In this particular example, the wire connecting links 12', 12" used at the edges of the wire belt 50 have the belt connecting ends 49 (See FIGS. 5B and 5C) that engage with the connecting ends 54, 56 used on the other wire links 52 in the wire belt 50. The wire connecting link 12 used in the center of the wire belt 50 has the female coupling portion 20 at one end and the male coupling portion 22 at the other end (See FIG. 5A).

Accordingly, the wire link connection system of the present invention uses wire connecting links that can be easily and securely interlocked with adjacent wire links and coupled to one another, for example, to provide a secure splice connection in a wire conveyor belt. When used in a wire conveyor belt, the wire connecting links are more easily woven between the wire links being spliced together without over bending and stressing wire links and without leaving large gaps between the wire links that can allow food products or other items to fall through.

Modifications and substitutions by one of ordinary skill in the art are considered to be within the scope of the present invention which is not to be limited except by the claims which follow.

What is claimed is:

1. A wire link connection system, for connecting a first wire link to a second wire link, said wire link connection system comprising:
   at least first and second wire connecting links, each of said first and second wire connecting links including first and second ends and at least one linking portion, for linking with said first and second wire links;
   said first wire connecting link including a coupling loop proximate one of said first and second ends of said first wire connecting link, said coupling loop defining an aperture; and
   said second wire connecting link including a coupling hook proximate one of said first and second ends of said second wire connecting link, said coupling hook including a flared head having a diameter larger than a diameter of said aperture defined by said coupling loop, wherein said coupling hook engages said coupling loop in a snap fit manner, for coupling said first and second wire connecting links.

2. The wire link connection system of claim 1 wherein said diameter of said aperture is substantially equal to a wire diameter of said first and second wire connecting links.

3. The wire link connection system of claim 1 wherein said loop extends generally in a circular path of at least about 270°.

4. The wire link connection system of claim 1 wherein said hook is cold headed.

5. The wire link connection system of claim 1 wherein said first wire connecting link further includes a coupling hook at the other of said first and second ends of said first wire connecting link.

6. The wire link connection system of claim 5 wherein said second wire connecting link further includes a coupling loop at the other of said first and second ends of said first wire connecting link.

7. A wire connecting link, for connecting first and second wire links, said wire connecting link comprising:
   a plurality of lateral segments;
   at least one bend segment extending between each of said plurality of lateral segments forming linking portions, for linking with said first and second wire links;
   a coupling hook disposed proximate an end of one of said plurality of lateral segments, for engaging a mating coupling loop of another wire connecting link; and
   a coupling loop disposed proximate an end of another of said plurality of lateral segments, said coupling loop defining an aperture, for receiving a mating coupling hook of another wire connecting link, wherein said coupling loop lies in a plane generally parallel to a plane of said wire connecting link.

8. The wire connecting link of claim 7 wherein said plurality of lateral segments further include first, second and third lateral segments, wherein a first bend segment extends between said first lateral segment and said second segment, and a second bend segment extends between said second lateral segment and said third lateral segment.

9. The wire connecting link of claim 8 wherein said coupling hook is disposed on said first lateral segment, wherein said coupling loop is disposed on said third lateral segment, and wherein a length of said first lateral segment is less than a length of said third lateral segment.

10. The wire connecting link of claim 7 wherein said coupling hook includes a flared head, having a diameter larger than a diameter of said aperture formed by said coupling loop.

11. The wire connecting link of claim 10 wherein said diameter of said aperture is substantially equal to a wire diameter of said wire connecting link.

12. A wire connecting link, for connecting first and second wire links in a wire belt, said wire connecting link comprising:
   a plurality of lateral segments;
   a bend segment extending between each of said plurality of lateral segments forming linking portions, for linking with said first and second wire links;
   a belt connecting end disposed at an end of one of said plurality of lateral segments, for engaging with belt connecting ends of one of said first and second wire links; and
   a coupling hook disposed proximate an end of another of said plurality of lateral segments, for mating with a mating coupling loop of another connecting link, wherein said coupling hook includes a flared head having a diameter larger than a diameter of an aperture formed by said mating coupling loop.

13. A wire belt comprising:
   a plurality of wire links, each of said plurality of wire links being linked with at least one adjacent wire link in said wire belt, wherein each of said wire links includes a first end, a second end, and a plurality of linking portions extending between said first end and said second end; and a splice connection between at least first and second wire links of said plurality of wire links, said splice connection including:
  at least first and second wire connecting links linked with respective linking portions of said first and second wire links of said plurality of wire links, wherein said first wire connecting link includes a female coupling portion, wherein said second wire connecting link includes a male coupling portion engaged with said female coupling portion in a press fit such that said first and second wire connecting links are prevented from articulating with respect to one another, and wherein said first and second wire connecting links connect said first and second wire links.

14. The wire belt of claim 13 wherein said female coupling portion is a loop defining an aperture, and wherein said male coupling portion is a hook adapted to be received by said aperture and lock with said loop.

15. The wire belt of claim 14 wherein said hook has a flared head.

16. The wire belt of claim 15 wherein a diameter of said flared head is larger than a diameter of said aperture formed by said loop.

17. The wire belt of claim 16 wherein said diameter of said aperture is substantially equal to a wire diameter of said first and second wire connecting links.

18. A method of connecting a first wire link to a second wire link in a wire belt having a plurality of wire links, each of said plurality of wire links having first and second ends and a plurality of linking portions between said first and second ends, said method comprising the steps of:
  interlocking a first wire connecting link with at least a first linking portion of each of said first wire link and said second wire link;
  interlocking a second wire connecting link with at least a second linking portion of each of said first wire link and said second wire link; and
  coupling a female coupling portion at one end of said first wire connecting link to a male coupling portion at one end of said second wire connecting link, wherein said male coupling portion engages said female coupling portion such that said first and second wire connecting links are prevented from articulating with respect to one another.

19. The method of claim 18 wherein the steps of interlocking said first wire connecting link and said second wire connecting link include weaving said first wire connecting link and said second wire connecting link respectively with said linking portions in said first and second wire links.

20. The method of claim 18 wherein said first wire link and said second wire link are connected to splice said wire belt.

21. A wire connecting link, for connecting first and second wire links in a wire belt, said wire connecting link comprising:
  a plurality of lateral segments;
  a bend segment extending between each of said plurality of lateral segments forming linking portions, for linking with said first and second wire links;
  a belt connecting end disposed at an end of one of said plurality of lateral segments, for engaging with belt connecting ends of one of said first and second wire links; and
  a coupling loop disposed proximate an end of another of said plurality of lateral segments, for mating with a mating coupling hook of another connecting link, wherein said coupling loop lies in a plane parallel to a plane of said wire connecting link.

* * * * *